United States Patent
Furuta et al.

(10) Patent No.: US 6,943,520 B2
(45) Date of Patent: Sep. 13, 2005

(54) TWO-LEGS WALKING TYPE MOVING DEVICE, METHOD AND DEVICE FOR CONTROLLING ITS WALKING

(75) Inventors: Takayuki Furuta, Tokyo (JP); Ken Tomiyama, Tachikawa (JP); Hiroaki Kitano, Kawagoe (JP)

(73) Assignee: Japan Science and Technology Agency, Kawaguchi (JP)

( * ) Notice: Subject to any disclaimer, the term of this patent is extended or adjusted under 35 U.S.C. 154(b) by 58 days.

(21) Appl. No.: 10/450,704

(22) PCT Filed: Jun. 3, 2002

(86) PCT No.: PCT/JP02/05422

§ 371 (c)(1),
(2), (4) Date: Jun. 23, 2003

(87) PCT Pub. No.: WO02/100606

PCT Pub. Date: Dec. 19, 2002

(65) Prior Publication Data

US 2004/0051493 A1 Mar. 18, 2004

(30) Foreign Application Priority Data

Jun. 7, 2001 (JP) .......................................... 2001-173262

(51) Int. Cl.[7] .............................. B25J 5/00; G05B 19/416
(52) U.S. Cl. ............................. 318/568.12; 318/568.18; 318/568.2; 318/568.22; 901/1; 700/245
(58) Field of Search ........................ 318/568.11, 568.12, 318/568.16, 568.17, 568.18, 568.2, 568.22; 180/8.1, 8.6; 901/1, 9; 700/245, 260, 254; 446/352, 354, 355

(56) References Cited

U.S. PATENT DOCUMENTS

| 5,355,064 A | | 10/1994 | Yoshino et al. |
| 5,432,417 A | | 7/1995 | Takenaka et al. |
| 5,459,659 A | * | 10/1995 | Takenaka ..................... 700/260 |
| 5,808,433 A | | 9/1998 | Tagami et al. |
| 2003/0125839 A1 | * | 7/2003 | Takenaka et al. ........... 700/245 |
| 2003/0139849 A1 | * | 7/2003 | Kuroki et al. ............... 700/245 |
| 2003/0144763 A1 | * | 7/2003 | Mori et al. .................. 700/245 |
| 2004/0044440 A1 | * | 3/2004 | Takenaka ..................... 700/245 |
| 2004/0122556 A1 | * | 6/2004 | Mori et al. .................. 700/245 |
| 2004/0211603 A1 | * | 10/2004 | Furuta et al. ................. 180/8.1 |
| 2004/0254679 A1 | * | 12/2004 | Nagasaka .................... 700/245 |

FOREIGN PATENT DOCUMENTS

| EP | 1 081 026 A2 | | 3/2001 | |
| JP | 05-305583 A | | 11/1993 | |
| JP | 2001-138273 A | | 5/2001 | |
| JP | 2002326173 A | * | 11/2002 | .............. B25J/5/00 |
| JP | 2004174652 A | * | 6/2004 | .............. B25J/5/00 |

* cited by examiner

*Primary Examiner*—David Martin
*Assistant Examiner*—Eduardo Colon Santana
(74) *Attorney, Agent, or Firm*—Westerman, Hattori, Daniels & Adrian, LLP (57) ABSTRACT

Disclosed is a biped walking mobile system which achieves stability without altering a preestablished gait, and a walk controller and control method therefor. The biped walking mobile apparatus includes a gait former for forming gait data and a walk controller for controlling actions of the drive means based on the gait data. The walk controller includes a ZMP compensator, including: a ZMP sensor, a ZMP converter for computing a ZMP target value based on the gait data from the gait former, and a ZMP compensating stage for comparing the actual measurement value of ZMP detected by the ZMP sensor with the ZMP target value from the ZMP converter to modify the targeted angular velocity and acceleration in the gait data and thereby to compensate or correct the ZMP target value. Thus, the targeted angular path of movement in the gait data remains unaltered when the ZMP target value is compensated.

15 Claims, 11 Drawing Sheets

TWO-LEGS WALKING TYPE MOVING DEVICE, METHOD AND DEVICE FOR CONTROLLING ITS WALKING

TECHNICAL FIELD

The present invention relates to a biped (two-footed) walking mobile system and, in particular, to a walk controller designed to stabilize walking.

BACKGROUND ART

A biped walking robot as it is called in the art has so far been made able to walk with two legs by producing in advance data for a pre-established walking pattern (hereinafter referred to as "gait") and actuating the legs in a controlled manner in accordance with the gait data so that the robot can bipedally walk as desired.

Such a conventional biped walking robot tends to become unstable in walking position due, for example, to floor or ground surface conditions and an error in the physical parameters of the robot itself and may then even turn over.

The stability in walking position of the robot may be improved by having the robot recognize its walking state and control its walking position in real time and without resort to the gait data. Even in this case, too, occurrence of an unanticipated surface condition lets the robot lose its regular walking position and may cause it eventually to turn over.

It has therefore been suggested to adopt what is called "ZMP (Zero Moment Point) compensation" whereby the points on the sole of a foot of the robot at each of which the composite moment of floor counterforce and gravity becomes zero are converged to a target value. Control methods for the ZMP compensation have been known including a method as described in JP 5-305583 A in which compliance control is used to converge the ZMPs to a target value and thereby to accelerate the upper body of the robot, and a method in which the locations on which the feet of the robot are being grounded are modified.

In these known control methods, the robot is sought to be stabilized by changing the angular velocity of a joint region of the robot to change the path in which it is moved. This, however, causes the respective paths of movement of such parts of the robot as its free leg ends and the position of its upper body to deviate from the gaits as gait data, thereby resulting in changes in the foot stride and the height of the free legs of the robot and also in an inclination of its upper body. Such an inclination of the upper body has been compensated for while being sensed by an inclination sensor.

In a biped walking robot constructed as mentioned above, however, not only is the compensation for the upper body required, but also it presents further problems. For example, there may be the case where the free leg landing position cannot be altered as in walking over the stepping-stones, the case where an obstacle must be passed under, or the case where an obstacle on the ground must be stepped over. Then, a change in the gait may cause a change in the foot stride or a change in the posture of the upper body and the foot, thus making the robot unable to land on the stepping stones with its free legs, or causing it to hit against the upper obstacle or to stumble over the obstacle on the ground.

With the aforementioned problems born in mind, it is an object of the present invention to provide a biped walk mobile system or apparatus as well as a walk controller and control method therefor, which can achieve walk stability without changing a path of movement for each of joint regions.

DISCLOSURE OF THE INVENTION

In order to attain the object mentioned above, there is provided in accordance with the present invention in a first aspect thereof, a biped walking mobile system which comprises: a main body having in its lower part a pair of leg portions attached thereto so as to be each pivotally movable biaxially, each of the leg portions having a knee portion in its midway and a foot portion at its lower end, the foot portions being attached to its corresponding leg portion so as to be pivotally movable biaxially, drive means associated with the said leg, knee and foot portions for pivotally moving them, respectively, a gait former for forming gait data including data for a target angular path, data for a targeted angular velocity and data for a targeted angular acceleration, and a walk controller for controlling respective driving actions of the said drive means on the basis of the said gait data, the said walk controller including a ZMP compensator, characterized in that the said ZMP compensator includes: a ZMP sensor for detecting ZMP for each of the said foot portions, a ZMP converter for computing a ZMP target value on the basis of the gait data from the said gait former, and a ZMP compensating stage for comparing an actual measurement value of ZMP detected by the said ZMP sensor with the ZMP target value from the said ZMP converter to modify the targeted angular velocity and acceleration in the gait data from the said gait former and thereby to compensate or correct the said ZMP target value.

The biped walking mobile system according to the present invention is preferably a humanoid robot having the said main body provided with a head portion and a pair of hand portions.

In the said biped walking mobile system according to the present invention, the compensating stage preferably comprises: a virtual ZMP target value former for comparing an actual measurement value of ZMP detected by the said ZMP sensor with the ZMP target value from the said ZMP converter to form a virtual ZMP target value, a parameter former for forming a force of inertia control parameter for use in forming the ZMP virtual target value from the ZMP target value to compensate the latter, and a stabilizing filter for compensating the said ZMP target value on the basis of the said force of inertia control parameter from the said parameter former.

In the said biped walking mobile system according to the present invention, the said ZMP virtual target value former is preferably adapted to judge if the formed ZMP virtual target value lies within a compensatable limit.

In the said biped walking mobile system according to the present invention, if the formed ZMP virtual target value is found to exceed the compensatable limit, the said ZMP virtual target value former is preferably adapted to repeat forming a ZMP virtual target value.

In order to achieve the object mentioned above, the present invention also provides in a second aspect thereof a walk controller for a biped walking mobile apparatus which includes: a main body having in its lower part a pair of leg portions attached thereto so as to be each pivotally movable biaxially, each of the leg portions having a knee portion in its midway and a foot portion at its lower end, the foot portions being attached to its corresponding leg portion so as to be pivotally movable biaxially, drive means associated with the said leg, knee and foot portions for pivotally moving them, respectively, and a gait former responsive to a demand for motion for forming gait data including data for a target angular path, data for a targeted angular velocity and data for a targeted angular acceleration, whereby the said walk controller controls respective driving actions of the said drive means on the basis of the said gait data, the said walk controller having a ZMP compensator and being characterized in that the said ZMP compensator includes: a ZMP sensor for detecting ZMP for each of the said foot portions, a ZMP converter for computing a ZMP target value on the basis of the gait data from the said gait former, and a ZMP compensating stage for comparing an actual measurement value of ZMP detected by the said ZMP sensor with the ZMP target value from the said ZMP converter to modify the targeted angular velocity and acceleration in the gait data from the said gait former and thereby to compensate or correct the said ZMP target value.

In the said walk controller for a biped walking mobile apparatus according to the present invention, the said ZMP compensating stage preferably comprises: a virtual ZMP target value former for comparing the actual measurement value of ZMP detected by the said ZMP sensor with the ZMP target value from the said ZMP converter to form a virtual ZMP target value, a parameter former for forming a force of inertia control parameter for use in for forming the ZMP virtual target value from the ZMP target value to compensate the latter, and a stabilizing filter for compensating the ZMP target value on the basis of the force of inertia control parameter from the said parameter former.

In the said walk controller for a biped walking mobile apparatus according to the present invention, the said ZMP virtual target value former is preferably adapted to judge if the formed ZMP virtual target value lies within a compensatable limit.

In the said walk controller for a biped walking mobile apparatus according to the present invention, if the formed ZMP virtual target value is found to exceed the compensatable limit, the aid ZMP virtual target value former is preferably adapted to repeat forming a ZMP virtual target value.

In order to achieve the object mentioned above, the present invention further provides in a third aspect thereof a walk control method for a biped walking mobile apparatus which includes: a main body having in its lower part a pair of leg portions attached thereto so as to be each pivotally movable biaxially, each of the leg portions having a knee portion in its midway and a foot portion at its lower end, the foot portions being attached to its corresponding leg portion so as to be pivotally movable biaxially, drive means associated with the said leg, knee and foot portions for pivotally moving them, respectively, and a gait former responsive to a demand for motion for forming gait data including data for a target angular path, data for a targeted angular velocity and data for a targeted angular acceleration, the method controlling respective driving actions of the said drive means on the basis of the said gait data, the method being characterized in that it in performing a ZMP compensation comprises: the first step of detecting ZMP for each of the said foot portions by a ZMP detecting sensor; the second step of computing a ZMP target value at a ZMP converter on the basis of the said gait data from the said gait former; and the third step of comparing a ZMP actual measurement value detected by the said ZMP detecting sensor with the ZMP target value and modifying the target angular velocity and angular acceleration in the gait data from the said gait former, thereby compensating the said ZMP target value.

In the said walk control method for a biped walking mobile apparatus according to the present invention, the third step preferably includes the sub-steps of: comparing the ZMP actual measurement value detected by the said ZMP sensor with the ZMP target value from the said ZMP converter to form a ZMP virtual target value, forming a force of inertia control parameter for use in forming the ZMP virtual target value from the ZMP target to compensate the latter, and compensating the said ZMP target value at a stabilizing filter on the basis of the said force of inertia control parameter.

In the said walk control method for a biped walking mobile apparatus according to the present invention, the step of forming the ZMP virtual target value includes judging if the formed virtual target value lies within a compensatable limit.

In the said walk control method for a biped walking mobile apparatus according to the present invention, the step of forming the ZMP virtual target value includes repeating forming a ZMP virtual target value if the formed ZMP virtual target value is found to exceed the compensatable limit.

In the basic makeup of the invention as described above, therefore, a ZMP target value is compensated by comparing a ZMP actual measurement value detected by a ZMP detecting sensor with a ZMP target value computed by a ZMP converter and using a ZMP compensator to modify a targeted angular velocity and a targeted angular acceleration in gait data from a gait former so as to control a force of inertia that develops on the biped mobile apparatus. This is designed to achieve stabilizing the apparatus main body, advantageously the upper body of the robot simply by converging the ZMP measurement error to zero and without changing the target paths of movement of the leg and foot portions. Thus, with the targeted angular path of movement in the gait data which remain unaltered when the ZMP target value is compensated, no case is there that the paths of movement of various parts of the mobile apparatus or robot such as its main body or legs come off those preestablished in the gait data.

This makes it possible to achieve walk control with certainty even in case, e.g., a the biped mobile apparatus has its free foot landing positions predetermined or unalterable such as in stepping-stones, or an obstacle needed to be stepped over or passed under.

Further, the ZMP compensation that is here effected utilizing the gait data formed by the gait former has no dependence on the manner in which they are formed. Hence it is simplified.

Further, this ZMP compensation in which a targeted angular path in gait data remains unaltered makes it unnecessary to compensate for the upper body on detecting its inclination as is needed in the prior art and permit ZMP compensation in an uncomplicated configuration.

Where the ZMP compensating stage comprises: a virtual ZMP target value former for comparing an actual measurement value of ZMP detected by the ZMP sensor with the ZMP target value from the ZMP converter to form a virtual ZMP target value, a parameter former for forming a force of inertia control parameter for use in forming the ZMP virtual target value from the ZMP target value to compensate the latter, and a stabilizing filter for compensating the ZMP target value on the basis of the force of inertia control parameter from the parameter former, the ZMP compensation can be effected in steps by using or seeking ZMP virtual target values step by step.

This stepwise compensation of ZMP, even in case the ZMP actual measurement value is initially largely deviated from the ZMP target value, ensures walk stability of the mobile apparatus by preventing an excessive torque from developing at each of the joint regions, thereby preventing the entire mobile apparatus from turning over.

Where the ZMP virtual target value former is adapted to judge if the formed ZMP virtual target value lies within a compensatable limit, if the judgment indicates that the formed ZMP virtual target value lies within the compensatable limit, the ZMP compensation effected for the formed virtual target value will not result in the turnover of the mobile apparatus. Thus, the ZMP compensation is completed at this ZMP virtual target value.

When the ZMP virtual target value former forms a new ZMP virtual target value if the formed ZMP target value is found to exceed the compensatable limit, the turnover of the mobile apparatus can be prevented by seeking to form a ZMP virtual target value within the compensatable limit in an attempt to bring the ZMP actual measurement value close to the ZMP target value to ensure walk stability for the biped walking mobile apparatus.

BRIEF DESCRIPTION OF THE DRAWINGS

The present invention will better be understood from the following detailed description and the drawings attached hereto showing certain illustrative forms of embodiment of the present invention. In this connection, it should be noted that such forms of embodiment illustrated in the accompanying drawings hereof are intended in no way to limit the present invention but to facilitate an explanation and understanding thereof. In the drawings.

BEST MODES FOR CARRYING OUT THE INVENTION

Hereinafter, the present invention will be described in detail with reference to suitable forms of embodiment thereof illustrated in the drawing figures.

Figure 1:
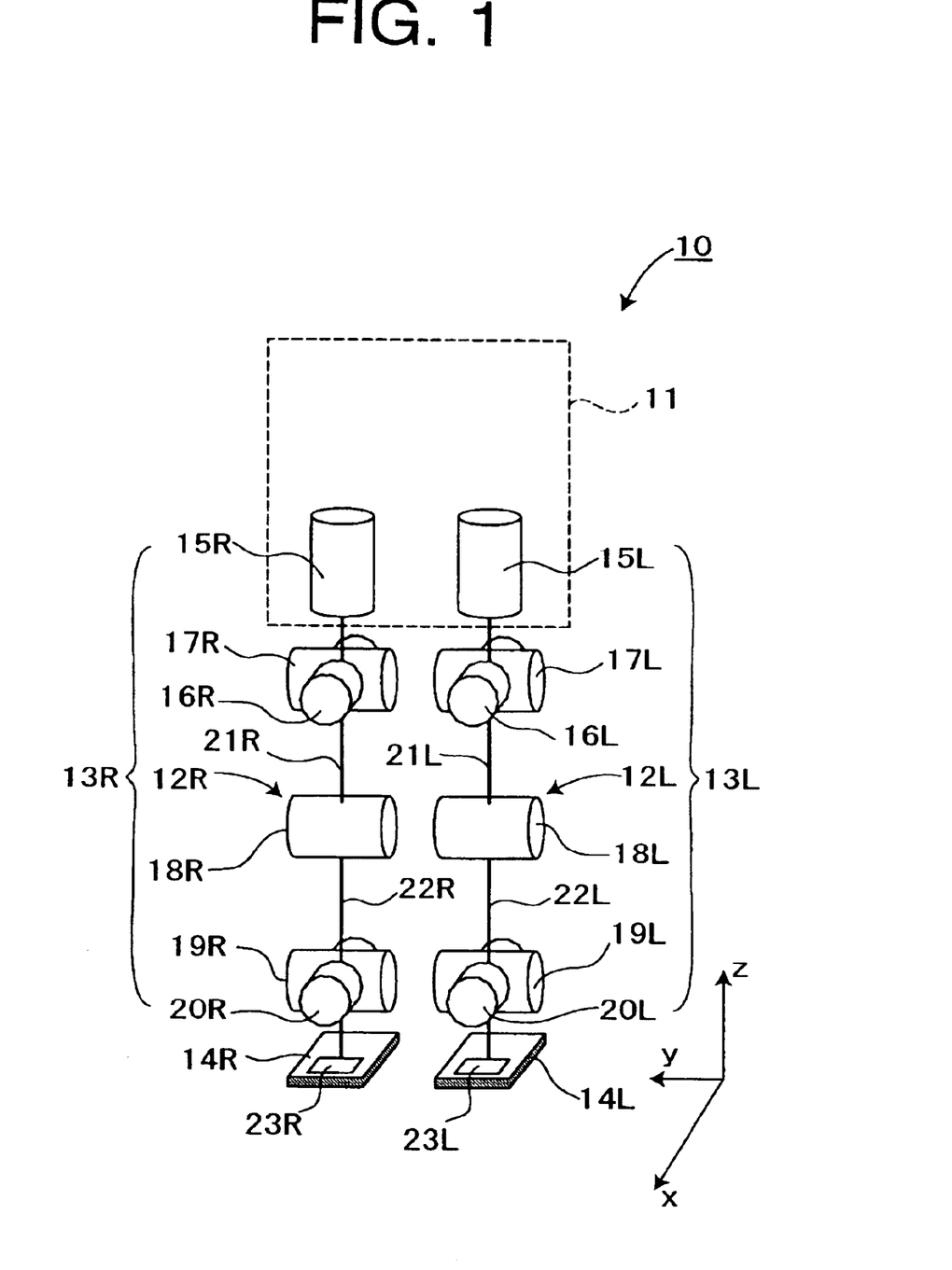
FIG. 1 is a schematic view illustrating the mechanical makeup of a biped walking robot according to the present invention as one form of embodiment thereof.
Figure 2:
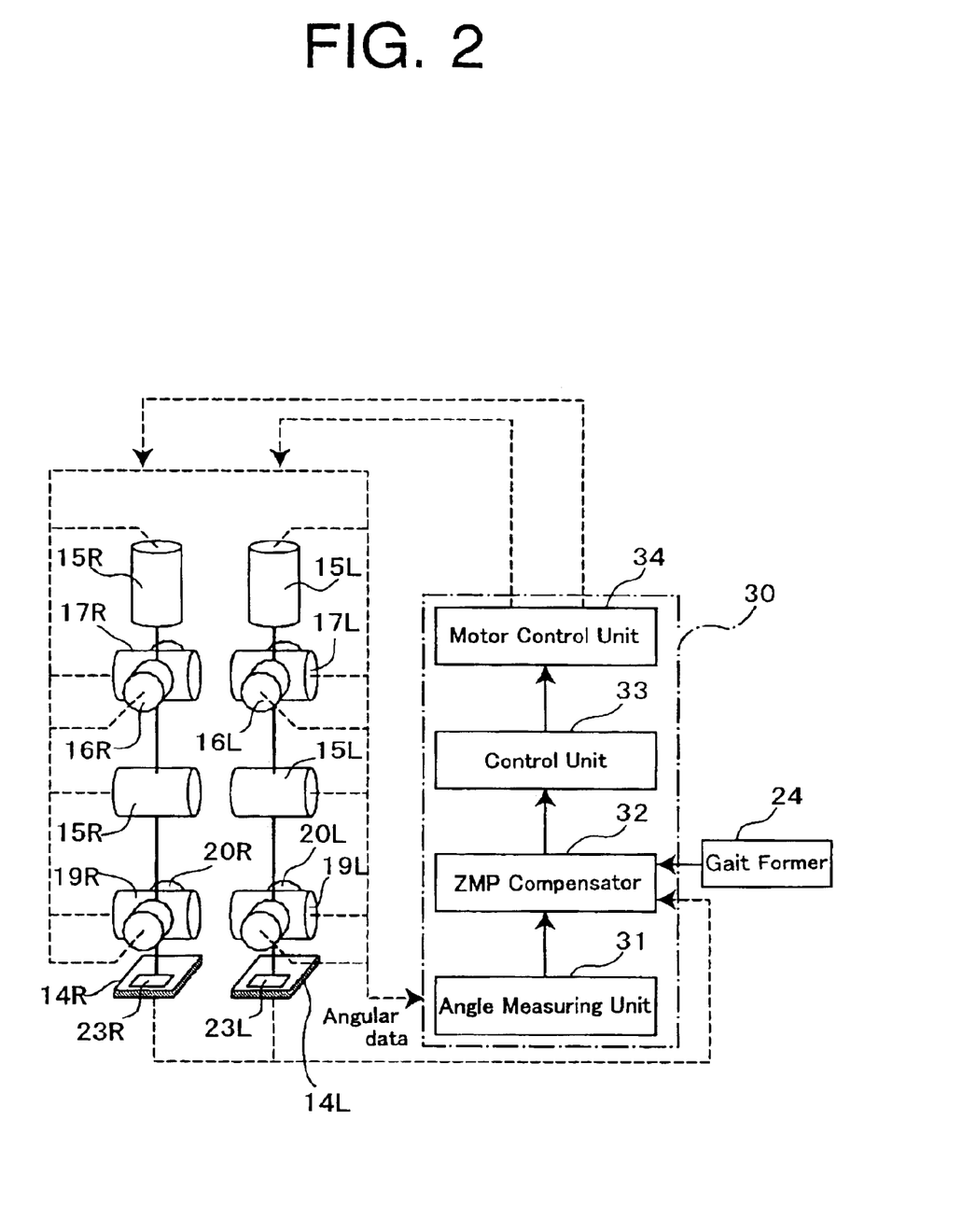
FIG. 2 is a block diagram illustrating the electrical makeup of the biped walking robot shown in FIG. 1.

FIGS. 1 and 2 show how a biped walking robot is constructed to which a biped walking mobile system of the present invention is applied as one form of embodiment thereof.

Referring to FIG. 1, the biped walking robot indicated by reference character 10 includes an upper body 11 as its main body portion and a pair of legs 13L and 13R attached to its lower part at opposite sides, each of the legs 13L and 13R having a knee 12L, 12R positioned in its midway and a foot 14L, 14R attached to its lower end (an ankle), respectively.

Here, each of the legs 13L and 13R has six (6) joint regions, namely stated in turn from upside, a waist joint region 15L, 15R for turning (pivotally moving) the corresponding leg 13L, 13R about a vertical z-axis, a first hip joint region 16L, 16R for turning the leg about a roll x-axis, a second hip joint region 17L, 17R for turning the leg about a pitch y-axis, a joint region 18L, 18R at the knee 16L, 16R for turning the lower leg about a pitch axis, a first ankle joint region 19L, 19R for turning the foot 14L, 14R about a pitch axis, and a second ankle joint region 20L, 20R for turning the foot about a roll axis. Each of these joint regions 15L, 15R to 20L, 20R is constituted as and by a joint drive motor.

It follows, therefore, that the waist/hip joints are made up of joint regions 15L, 15R; 16L, 16R; and 17L, 17R and the foot joints are made up of joint regions 19L, 19R and 20L, 20R. It follows further that the waist/hip joints and the knee joints are connected by an upper leg link 21L, 21R for each leg 13L, 13R while the knee joints and the ankle joints are connected by lower leg links 22L, 22R for each leg 13L, 13R.

This makeup provides six (6) degrees of freedom for each of the left and right hand side legs 13L, 13R including the feet 14L and 14R of the biped walking robot 10. The robot 10 is thus so configured that when these twelve (12) joint regions are driven by the respective drive motors in a controlled manner to make proper angular movements such as to move the legs 13L and 13R and the feet 14L and 14R properly as a whole, the robot is able to walk in any way as desired in a three-dimensional space.

Furthermore, the feet 14L and 14R are provided with ZMP detecting sensors 23L and 23R, respectively. The ZMP detecting sensors 23L and 23R are each designed to detect a ZMP that is the center point of the counterforce received by the sole of the foot 14L, 14R from the floor and to output an actual measurement value of ZMP. In passing, it should be noted here that the robot upper body 11 shown as being box like may actually be provided with a head and a pair of hands.

FIG. 2 shows the electrical makeup of the biped walking robot 10 shown in FIG. 1. Referring to FIG. 2, the biped walking robot 10 includes a gait former 24 for forming gait data in response to a demand for motion, and a walk controller 30 responsive to these gait data for controlling respective movements of the joint regions 15L, 15R to 20L, 20R by controlling their respective drive motors' driving actions. In coordinating these joint movements for the biped walking robot 10, use is here made of an xyz-coordinate system with an x-axis extending in a longitudinal direction (frontward +). a y-axis extending in a transverse direction (inward +) and a z-axis extending in a vertical direction (upward +).

The gait former 24 is adapted to form gait data including a target angular paths θ ref, a targeted angular velocity (d θ ref/dt) and a targeted angular acceleration ($d^2\theta$ ref/$dt^2$) in the movement of each of the joint regions 15L, 15R to 20L, 20R necessitated for the biped walking robot to walk in accordance with the demand for motion input externally.

The walk controller 30 includes an angle measuring unit 31, a ZMP compensator 32, a control unit 33 and a motor control unit 34. The angle measuring unit 31 is adapted to be responsive to angular data derived from such as rotary encoders provided for the joint drive motors for the joint regions 15L, 15R to 20L, 20R to measure the respective angular positions of the joint drive motors and furnish the control unit 33 therewith.

The ZMP compensator 32 as detailed below is adapted to be responsive to an actual measurement values of ZMP from the ZMP detecting sensor 23L, 23R to compensate or correct the target ZMP value in the gait data from the gait former 24.

The control unit 33 is adapted to be responsive to the corrected target ZMP value furnished from the ZMP compensator 32 and to the angular position of each of the joint drive motors furnished from the angle measuring unit 31 to produce control signals for the joint drive motors.

The motor control unit 34 is adapted to be responsive to the control signals furnished from the control unit 33 to drive the joint drive motors controllably in accordance therewith.

Figure 3:
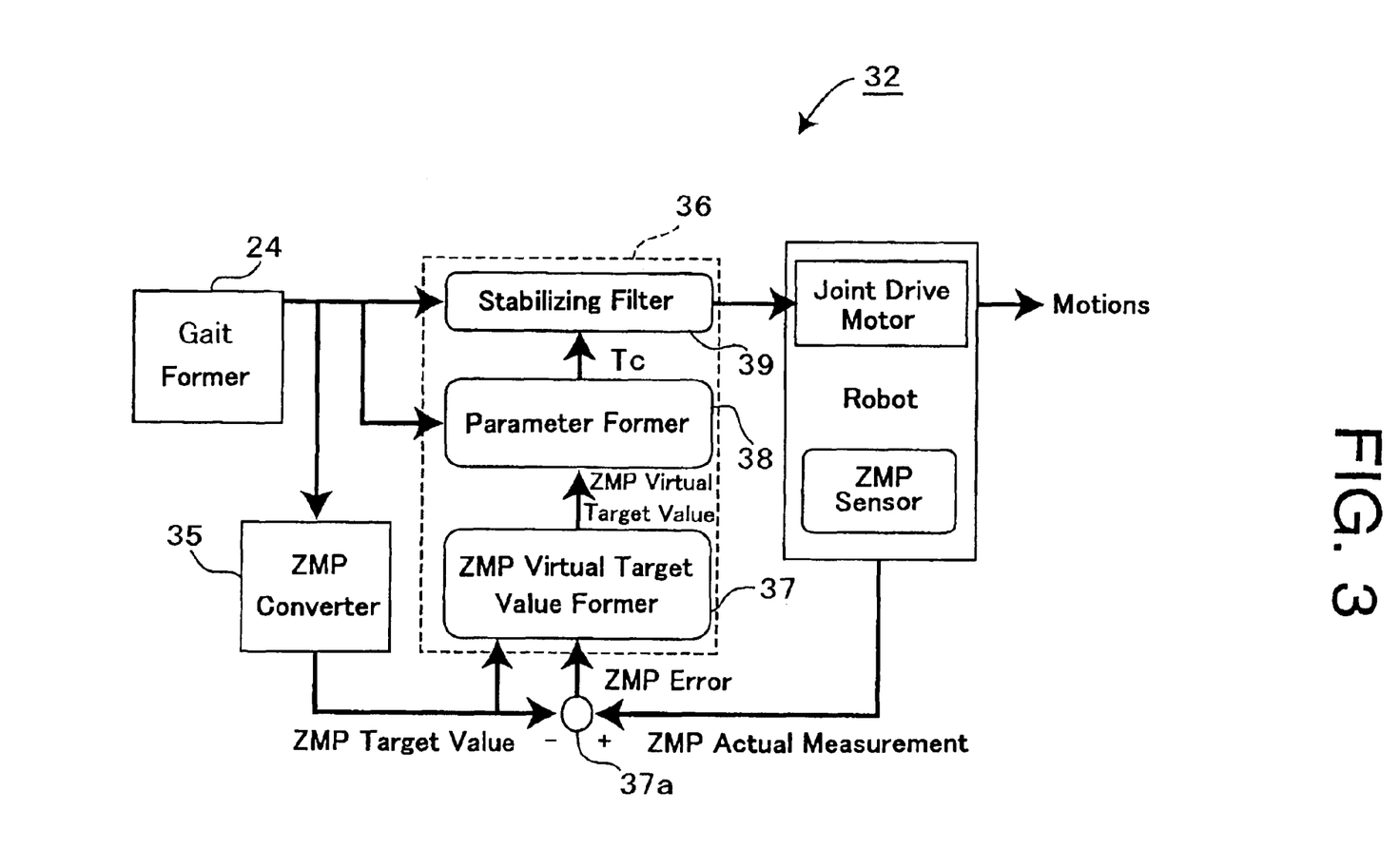
FIG. 3 is a block diagram illustrating the makeup of a ZMP compensator in the biped walking robot shown in FIG. 1.

Here, the ZMP compensator 32 is made up as shown in FIG. 3. Referring to FIG. 3, the ZMP compensator 32 is comprised of a ZMP converter 35 and a ZMP compensating stage 36. The ZMP converter 35 is responsive to the target angular path θ ref, the targeted angular velocity (d θ ref/dt) and the targeted angular acceleration ($d^2\theta$ ref/$dt^2$) in the gait data furnished from the gait former 24 to compute a ZMP target value ZMPref. The ZMP target value ZMPref is computed as stated below.

Figure 4:
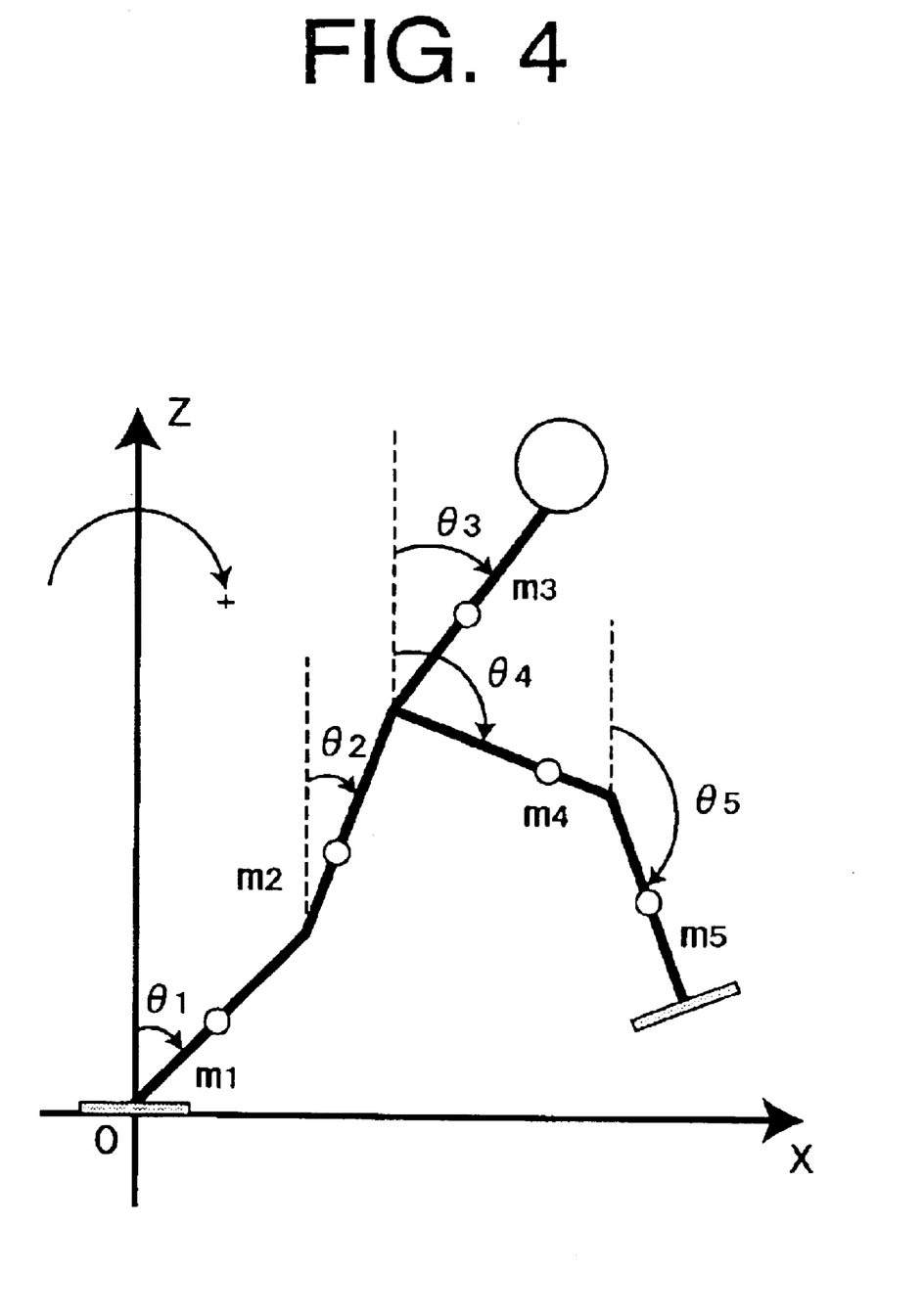
FIG. 4 is a schematic view illustrating an xz-plane split model for the biped walking robot of FIG. 1 shown as it is walking.

As shown in FIG. 4, it is assumed that the stamping foot of the biped walking robot 10 lies at the origin of a xz-plane, and that for the stamping leg the lower leg portion 22L or 22R has a mass m1 and is inclined at an angle θ1 and the upper leg portion 21L or 21R has a mass m2 and is inclined at an angle θ2, and the upper body has a mass m3 and is inclined at an angle θ3, and that for the free leg the upper leg portion 21R or 21L has a mass m4 and is inclined at an angle θ4 and the lower leg portion 22R or 22L has a mass m5 and is inclined at an angle θ5. Then, ZMP($X_{zmp}$), ZMP about the pitch axis, is expressed by equation (1) as follows:

$$X_{zmp} = \frac{\sum_{i=0}^{n} x_i m_i (\ddot{z}_i + g) - \sum_{i=0}^{n} m_i \ddot{x}_i z_i}{\sum_{i=0}^{n} x_i m_i (\ddot{z}_i + g)} \quad (1)$$

Likewise, ZMP($Y_{zmp}$), ZMP about the roll axis, can be computed.

The ZMP compensating section 36 as shown in FIG. 3 is comprised of a ZMP virtual target value former 37, a parameter former 38 and a stabilizing filter 39. The ZMP virtual target value former 37 included to compare the actual measurement value of ZMP detected by the ZMP detecting sensor with the ZMP target value ZMPref furnished from the ZMP converter 35 to form a ZMP virtual target value ZMPvref. More specifically, the ZMP virtual target value former 37 is adapted to form from a ZMP error ZMPerr (=ZMPref−ZMP actual measurement value) computed by a subtractor 37a and the ZMP target value ZMPref, a ZMP virtual target value ZMPvref expressed by equation (2) as follows:

$$ZMP_{vref} = ZMP_{ref} + \alpha \cdot ZMP_{error} \quad (2)$$

where α represents a gain.

The ZMP virtual target value former 37 is further designed to judge if the ZMP virtual target value ZMPvref is within a preset correctable limit and, if the latter is exceeded, repeats the process of forming a ZMP virtual target value ZMPvref.

The parameter former 38 is adapted to be responsive to the ZMP virtual target value ZMPvref furnished from the ZMP virtual target value former 37 and the target angular paths θ ref, the targeted angular velocity (d θ ref/dt) and the targeted angular acceleration ($d^2\theta$ ref/$dt^2$) furnished from the gait former 24 and, utilizing a compensating function, to compute a force of inertia or effective force required for the ZMP actual measurement value to be corrected to become the ZMP virtual target value ZMPvref and then to compute a force of inertia control parameter Tc according to the force of inertia. This force of inertia control parameter Tc is derived from or expressed by equation (3) below, which is derived from the aforementioned ZMP computational formula about the pitch axis and is referred to as ZMP compensation function.

$$T_c = \frac{2_k T_{c\_old}}{\lambda + \sqrt{\lambda^2 - 4k\mu T_{c\_old}^2}} \quad (3)$$

where κ, λ and μ are parameters determined by physical quantities and θ ref.

Likewise, the ZMP compensation function about the roll axis can be derived as well.

The parameter former 38 is thus designed to cause the force of inertia control parameter Tc to virtually expand and contract the ZMP sampling interval, thereby bringing about the force of inertia required to achieve the ZMP target value.

The stabilizing filter 39 is adapted to be responsive to the force control parameter Tc to compute from the target angular path θ ref, the targeted angular velocity (d θ ref/dt) and the targeted angular acceleration ($d^2\theta$ ref/$dt^2$) in the gait data furnished from the gait former 24, a target angular path θ c, a target angular velocity (d θ c/dt) and a target angular acceleration ($d^2\theta$ c/$dt^2$) corrected for each of the joint regions.

The illustrated biped walking robot of the invention constructed as mentioned above is operated for walking as shown in the flow chart of FIG. 5 and described below.

Figure 5:
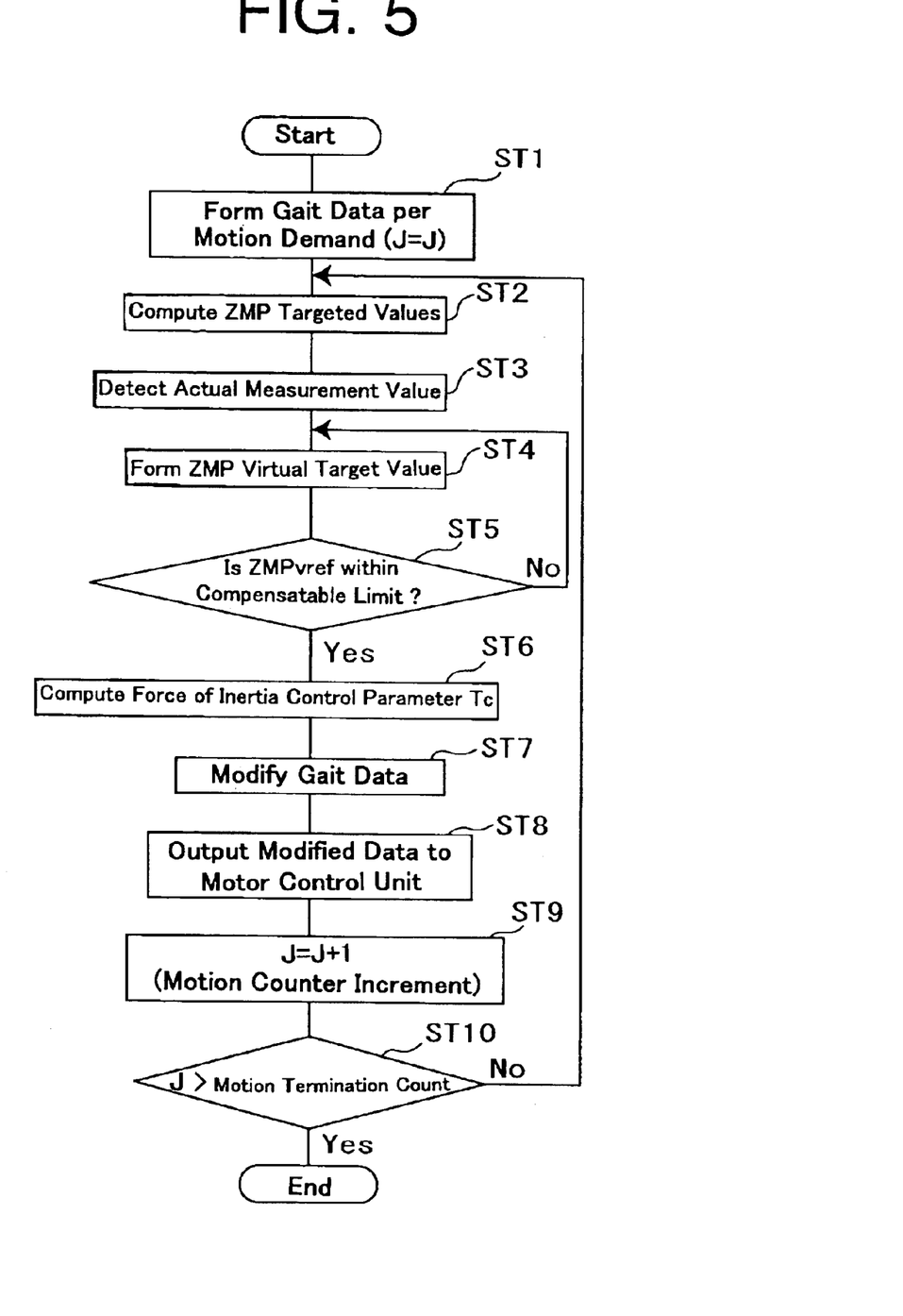
FIG. 5 is a flow chart illustrating a walk control operation for the biped walking robot shown in FIG. 1.

Referring to FIG. 5, in step ST1 the gait former 24 on the basis of an input demand for motion (J=J) forms the gait data, and furnishes the ZMP compensator 32 in the walk controller 30 therewith.

In step ST2, the ZMP converter 35 in the ZMP compensator 32 on the basis of the formed gait data, computes from the target angle θ ref, the targeted angular velocity (d θ ref/dt) and the targeted angular acceleration ($d^2\theta$ ref/$dt^2$) for each of the joint regions 16L, 16R to 20L, 20R in the gait data, a ZMP target value. In the meantime, in step ST3 the ZMP detecting sensor 23L, 23R in the foot 14L, 14R detect an actual ZMP value. This permits the ZMP virtual target value former 37 in step ST4 to form from an ZMP error ZMPerr furnished from the subtractor 37a and the ZMP target value ZMPref furnished from the ZMP converter 35, a ZMP virtual target value ZMPvref.

Next, in step ST5 the ZMP virtual target value former 37 judges if the ZMP virtual target value ZMPvref is within a compensatable limit and, if it is not, returns to step ST4 to cause the ZMP virtual target value former 37 to repeat the process of forming a ZMP virtual target value and, if it is, sends the acceptable ZMP virtual target value ZMPvref to the parameter former 38.

Then, in step ST6 the parameter former 38 computes from the ZMP virtual target value ZMPvref, the target angle θ ref, the targeted angular velocity (d θ ref/dt) and the targeted angular acceleration ($d^2θ$ ref/$dt^2$) for each of the joint regions 16L, 16R to 20L, 20R in the gait data from the gait former 24, a force of inertia control parameter Tc according to the ZMP compensation function, and sends the same to the stabilizing filter 39.

Next, in step ST7 the stabilizing filter 39 on the basis the force of inertia control parameter Tc modifies the targeted angle θ ref, the targeted angular velocity (d θ ref/dt) and the targeted angular acceleration ($d^2θ$ ref/$dt^2$) for each of the joint regions 16L, 16R to 20L, 20R in the gait data from the gait former 24 and provides for a target angular path θ c, a target angular velocity (d θ c/dt) and a target angular acceleration ($d^2θ$ c/$dt^2$) corrected for each of those joint regions.

Then, in step ST8 the ZMP compensator 32 furnishes the control unit 33 with the corrected gait data, namely the target angular path θ c, the target angular velocity (d θ c/dt) and the target angular acceleration ($d^2θ$ c/$dt^2$) for each of the joint regions 16L, 16R to 20L, 20R to cause the motor control unit 34 to control respective driving actions of the joint drive motors for the joint regions. In this manner, the biped walking robot 10 is allowed to perform an actual walking movement in accordance with the demanded walking motion.

Subsequently, step ST9 in which the control unit 33 having J raised to J=J+1 according to motion counter increment stands by until a preset sampling time period is elapsed is followed by step 10 in which if J is less than a preset motion termination count, the process is returned to step 2 for the repetition of the operation mentioned above and if the preset motion termination count is exceeded by J, the operation is terminated.

Figure 6:
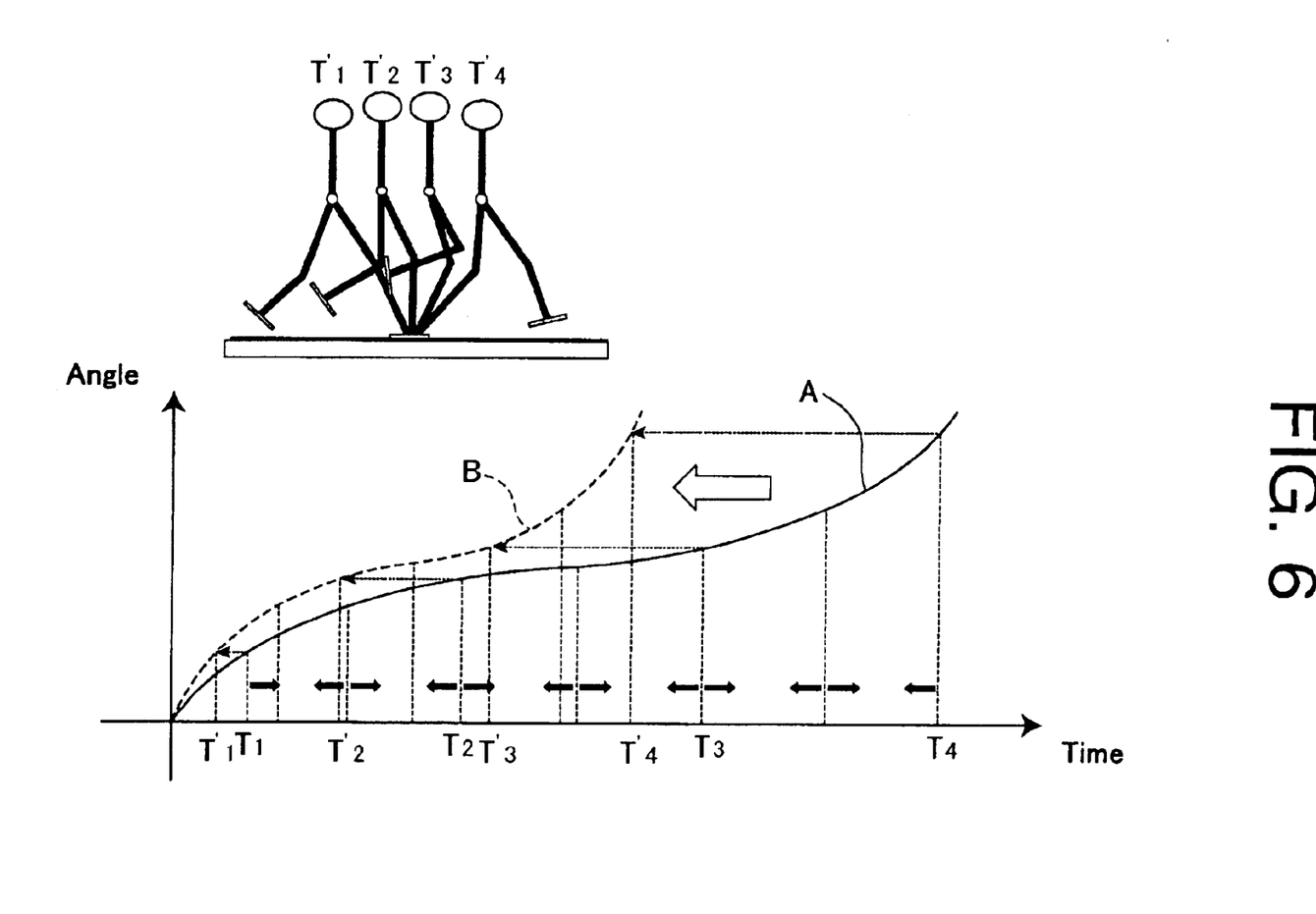
FIG. 6 is a schematic diagram illustrating an angular acceleration control in the ZMP compensation for the biped walking robot shown in FIG. 1.

In this case, altering a targeted angular acceleration ($d^2θ$ ref/$dt^2$) to a modified target angular acceleration ($d^2θ$ c/$dt^2$) when the driving action of the drive motor for each of the joints is controlled in this biped walking robot 10 causes a change in the acceleration acting on the robot 10 and in turn a change in the force of inertia as a reaction to the acceleration. It follows, therefore, that the force of inertia acting on the robot 10 is controlled adequately according to the change in the targeted angular acceleration ($d^2θ$ ref/$dt^2$). This permits the robot 10 as shown in FIG. 6 to walk along a path of movement A that remains unaltered but with the path of movement B expanded or contracted in time as appropriate, thereby performing walking movements in accordance with the input motion demands.

It should be noted further that the ZMP virtual target value former 37 is designed to form from a ZMP target value ZMPref and a ZMP actual measurement value a ZMP virtual target value ZMPvref once so that if the ZMP actual measurement value deviates largely from the ZMP target value, the ZMP compensation is effected so as to bring the ZMP actual measurement value close to the ZMP target value step by step. This permits the robot 10 to walk in a stabilized state since each of the joint regions is prevented from experiencing an excessive angular acceleration even if the ZMP actual measurement value deviates largely from the ZMP target value.

Thus, the biped walking robot 10 of the invention is provided as illustrated wherein a ZMP error that is a difference between the ZMP target value and the ZMP actual measurement value is used to compensate for the ZMP target value and thereby to modify a targeted angular velocity and a targeted angular acceleration in the gait data so as to control a force of inertia that develops on the robot 10. This permits achieving walk stabilization for the robot 10 simply by converging such ZMP errors to zero and without changing the path of its walking motions.

Mention is next made of simulation experiments and real robot experiments as for the biped walking robot 10 of the present invention.

Figure 7:
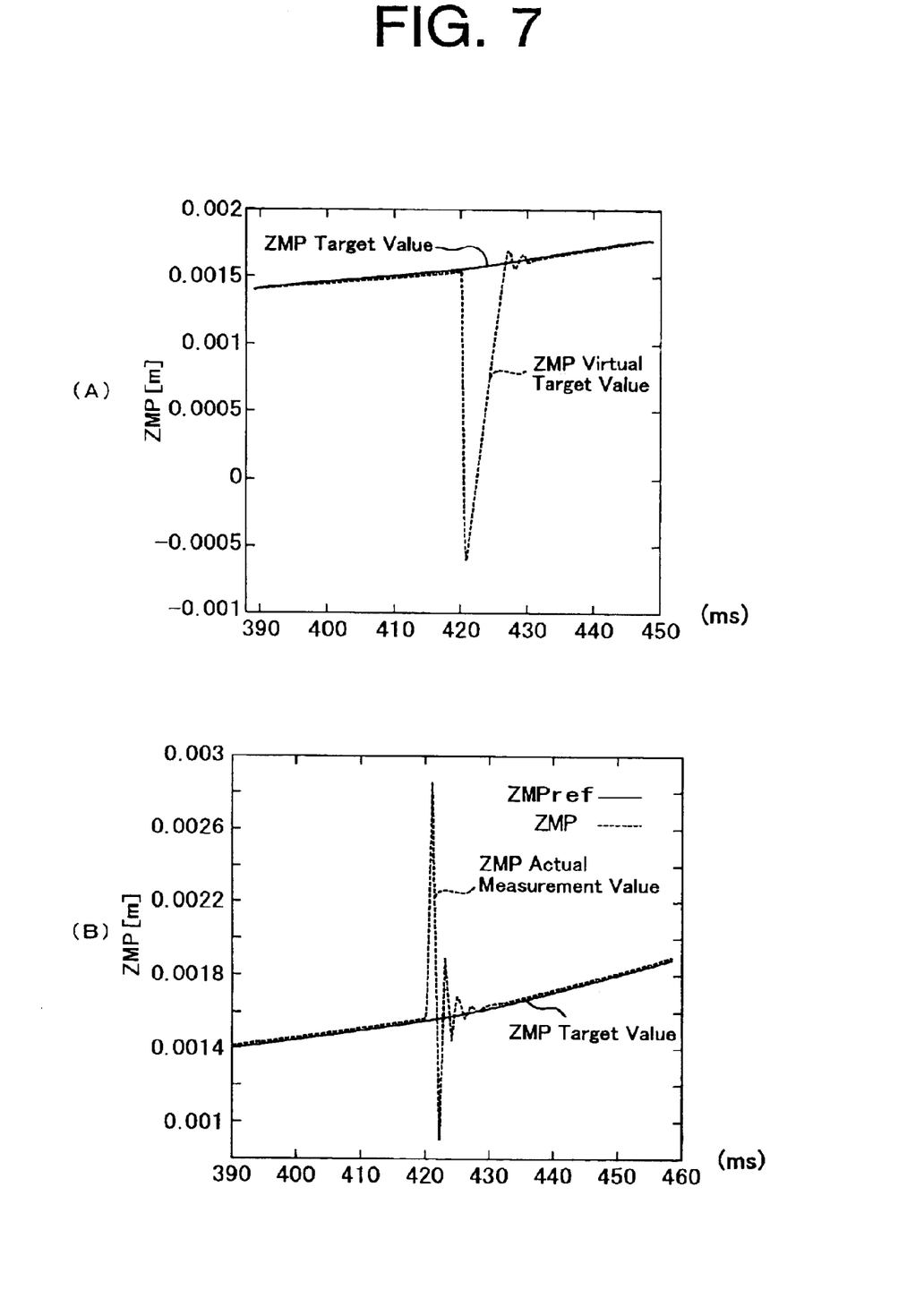
FIG. 7 shows graphs indicating the ZMP virtual target value and the ZMP actual measurement value in simulation experiments for the biped walking robot shown in FIG. 1.
Figure 8:
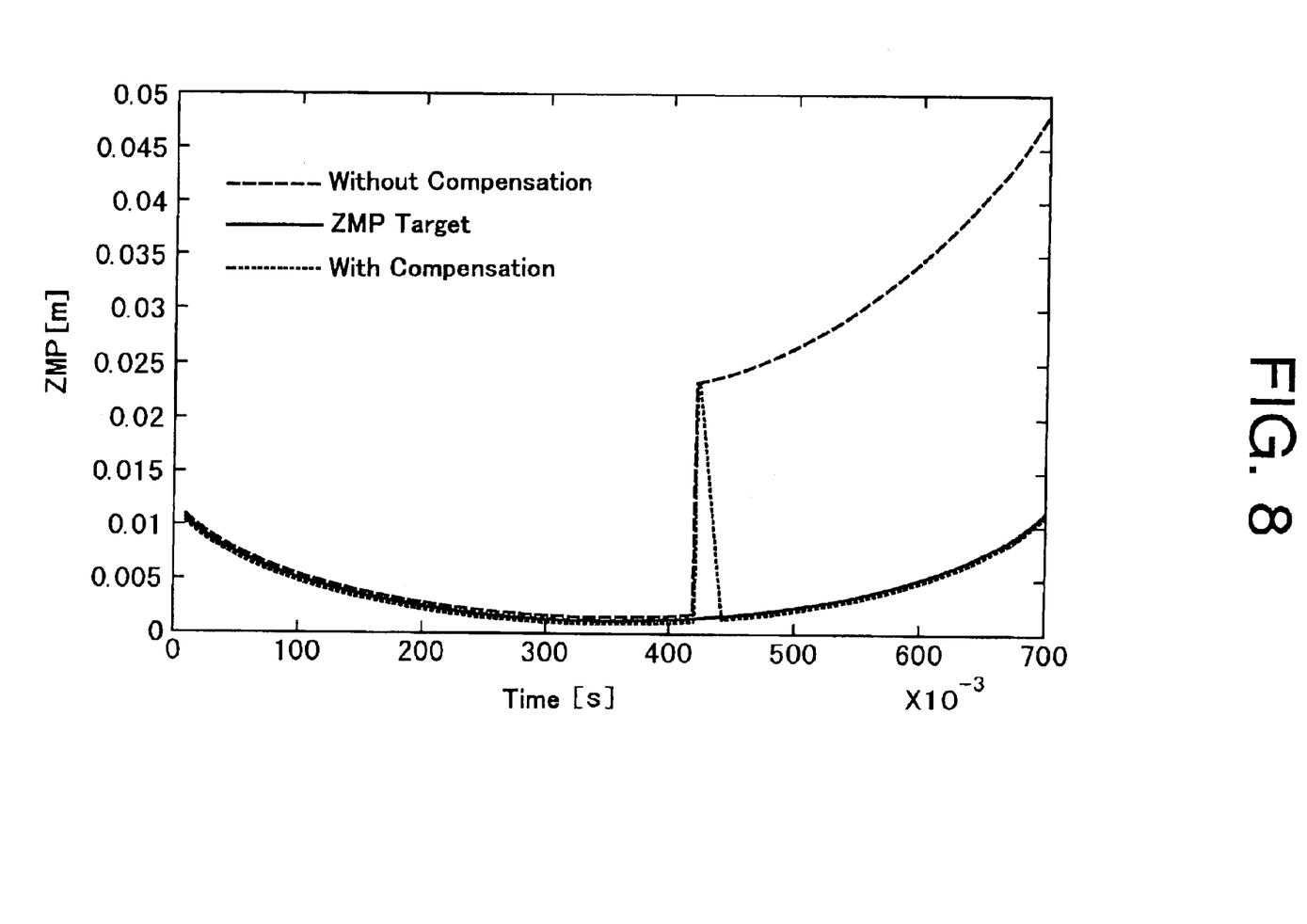
FIG. 8 is graph indicating the ZMP target value and ZMP actual measurement value with ZMP compensation and the ZMP actual measurement value without ZMP compensation in simulation experiments for the biped walking robot shown in FIG. 1.

Mention is first made of a simulation experiment in which a biped walking robot 10 as mentioned above was let to step dynamically in the yz-plane. The robot standing on one leg was given a disturbance at 0.43 second thence to bring about a deviation from a target value for ZMP. It is confirmed that the ZMP virtual target value ZMPvref then formed by the ZMP virtual target value former 37 as shown in FIG. 7(A) is substantially converged (returned) to the ZMP target value and so is the ZMP actual measurement value correctly modified to the ZMP target value as shown in FIG. 7(B), both before 0.43 second. Without the ZMP compensation, FIG. 8 shows that the ZMP target value deviated remains largely deviated from the ZMP target value.

Figure 9:
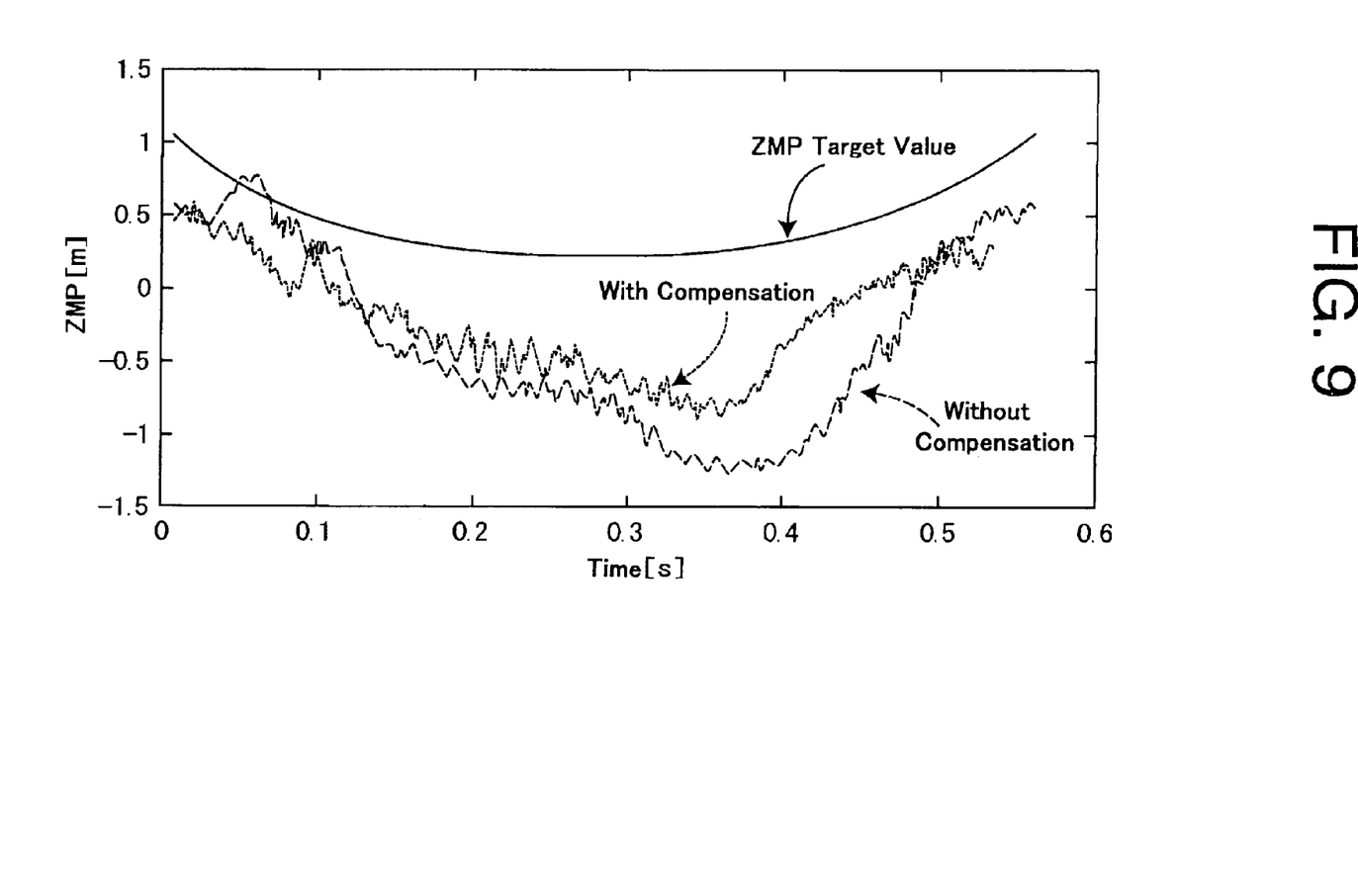
FIG. 9 is a graph showing the ZMP target value and the ZMP actual measurement value with ZMP compensation and the ZMP actual measurement value without ZMP compensation in real robot experiments for the biped walking robot shown in FIG. 1.

In a real robot experiment, the biped walking robot 10 had a total mass of 1370 grams, a total height of 30.0 cm, and a foot sole with a width of 6.0 cm in the roll (y) direction and a length of 8.0 cm in the pitch (x) direction and was let to step. From FIG. 9 indicating that the ZMP actual measurement value is closer to the ZMP target value in the ZMP compensation than in the case without the ZMP compensation, it is seen that the ZMP compensation improves the robot walking stability.

Figure 10:
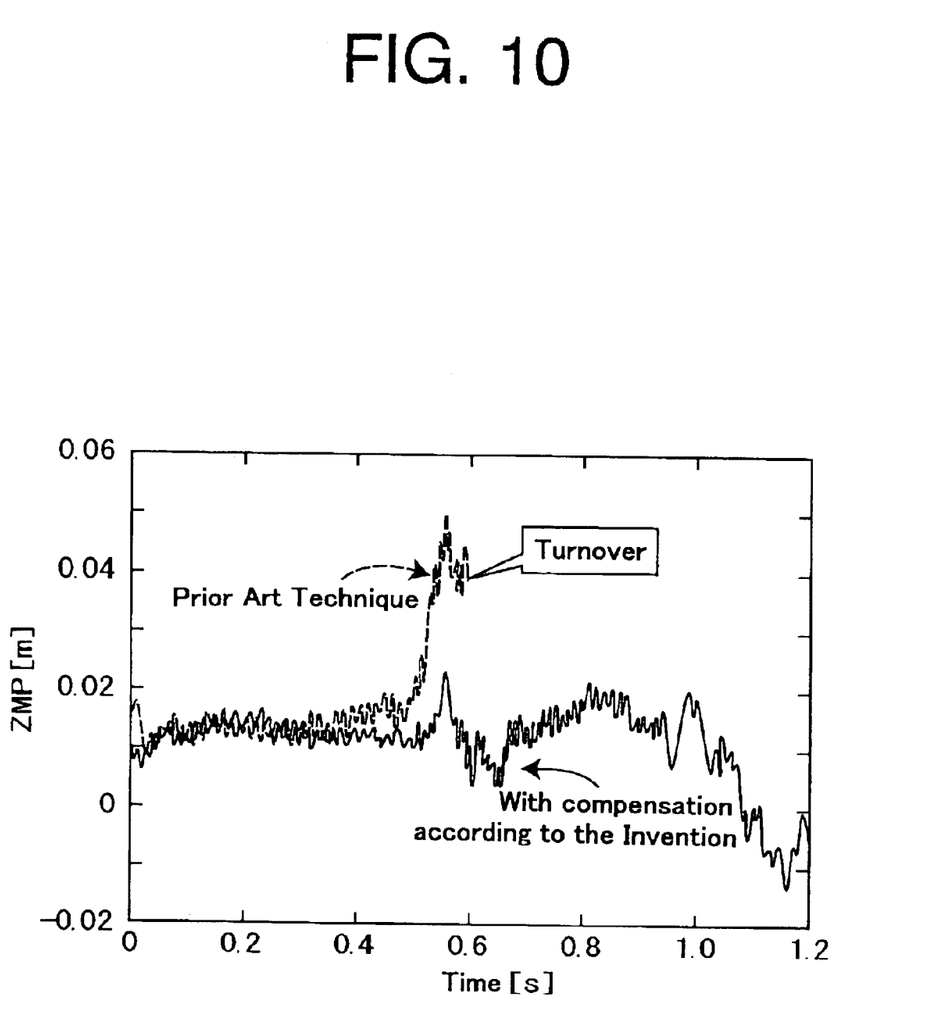
FIG. 10 is a graph showing the ZMP actual measurement value in another real robot experiment for the biped walking robot shown in FIG. 1 and the ZMP actual measurement value with the conventional ZMP compensation.
Figure 11:
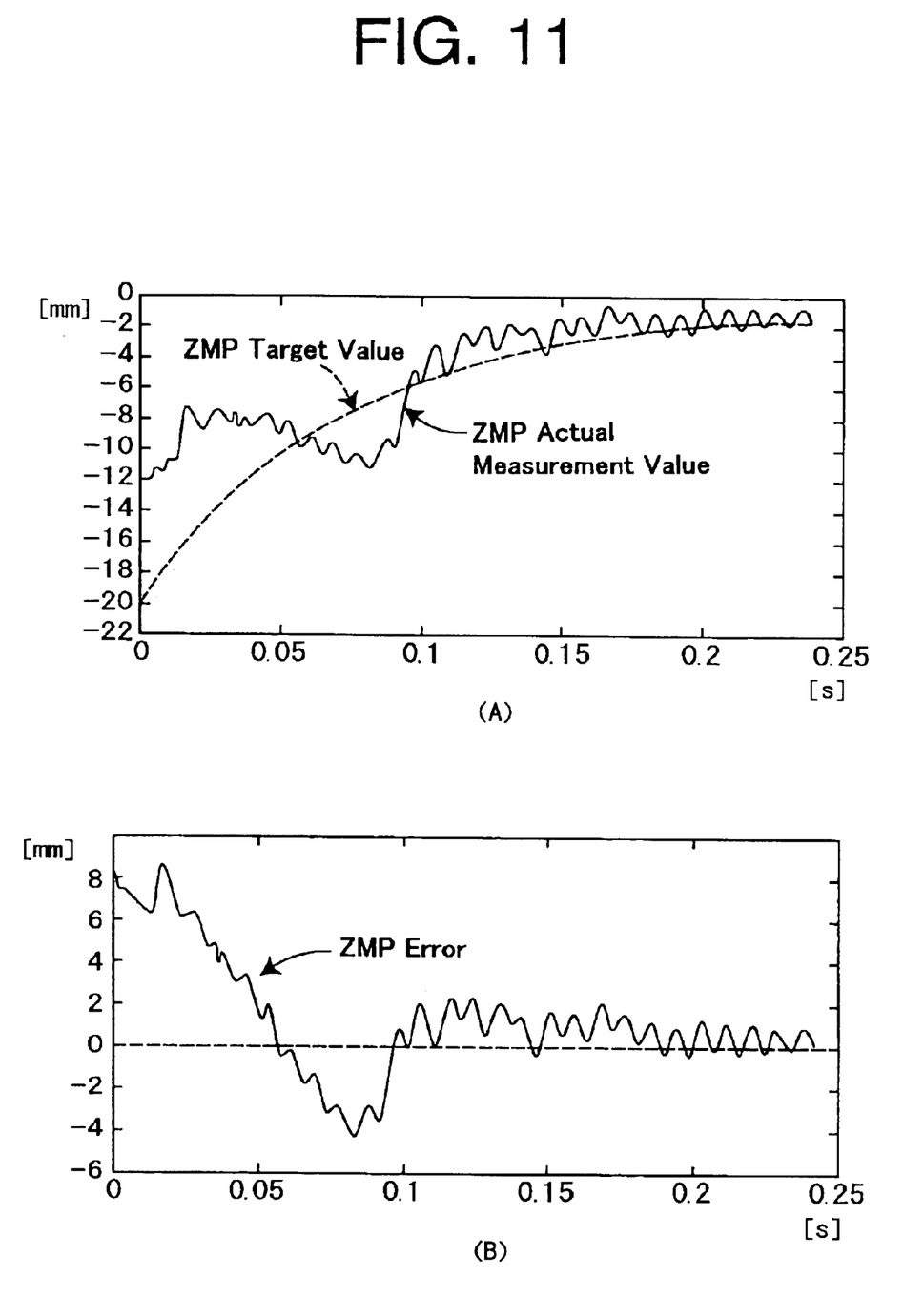
FIG. 11 is an enlarged graph showing at A the ZMP target value and the ZMP actual measurement value and at B the ZMP error, immediately after a disturbance is given in the real robot experiment of FIG. 10.

Another real robot experiment as in the simulation experiment mentioned above gave a disturbance to the robot stepping. The ZMP compensation according to the present invention brings the ZMP actual measurement value close to the ZMP target value with certainty as shown in FIG. 10 and also makes the ZMP error close to zero as shown in FIG. 11 indicating that robot is walking stability is improved. When the conventional ZMP compensation is followed, FIG. 10 shows that the robot was turned over at a lapse of time of about 0.5 second after it had the disturbance.

While mention is made above of the experiments about the robot stepping in the yz-plane, it should be evident that the biped walking robot 10 has an improved walking stability in the xz-plane as well. Also, although the present invention has been described in certain forms of embodiment when applied to a biped walking robot, it should be obvious that the invention is applicable to any biped walking mobile apparatus walkable with a pair of legs.

As described in the foregoing, the present invention provides a system in which a ZMP target value is compensated by comparing a ZMP actual measurement value detected by a ZMP detecting sensor with a ZMP target value computed by a ZMP converter and using a ZMP compensator to modify a targeted angular velocity and a targeted angular acceleration in gait data from a gait former so as to control a force of inertia that develops on the biped mobile apparatus. As a result, it becomes possible to achieve stabilizing the apparatus main body, advantageously the upper body of the robot simply by converging the ZMP measurement error to zero and without changing the paths of movement of the leg and foot portions. Thus, with the targeted angular path of movement in the gait data which remains unaltered when the ZMP target value is compensated, no case is there that the paths of movement of various parts of the mobile apparatus or robot such as its main body or legs come off those preestablished in the gait data. Accordingly, even in case, e. g., a biped mobile apparatus has its free foot landing positions predetermined or unalterable such as in stepping-stones, or an obstacle needed to be stepped over or passed under, it is made possible to achieve walk control with certainty.

Further, the ZMP compensation that is here effected utilizing the gait data formed by the gait former has no dependence on the manner in which they are formed. Hence it is simplified. Further, this ZMP compensation in which a targeted angular path in gait data remains unaltered makes it unnecessary to compensate the upper body upon detecting its inclination as is needed in the prior art and permit ZMP compensation in an uncomplicated configuration.

Industrial Applicability

The present invention provides a surpassing biped walking mobile system or apparatus as well as a walk controller and a walk control method, which can achieve walk stability without changing a gait, namely a preestablished path of movement of each of various joint portions.

What is claimed is:

1. A biped walking mobile system, comprising:
   a main body having in its lower part a pair of leg portions attached thereto so as to be each pivotally movable biaxially, each of the leg portions having a knee portion in its midway and a foot portion at its lower end, the foot portions being attached to its corresponding leg portion so as to be pivotally movable biaxially,
   drive means associated with said leg, knee and foot portions for pivotally moving them, respectively,
   a gait former responsive to a demand for motion for forming gait data including data for a target angular path, data for a targeted angular velocity and data for a targeted angular acceleration, and
   a walk controller for controlling respective driving actions of said drive means on the basis of said gait data, said walk controller including a ZMP compensator, characterized in that said ZMP compensator includes:
   a ZMP sensor for detecting ZMP for each of said foot portions,
   a ZMP converter for computing a ZMP target value on the basis of the gait data from said gait former, and
   a ZMP compensating stage for comparing an actual measurement value of ZMP detected by said ZMP sensor with the ZMP target value from said ZMP converter to modify the targeted angular velocity and acceleration in the gait data from said gait former and thereby to compensate or correct said ZMP target value, wherein ZMP stand for Zero Moment Point.

2. A biped walking mobile system as set forth in claim 1, characterized in that said biped walking mobile system is a humanoid robot having said main body provided with a head portion and a pair of hand portions.

3. A biped walking mobile system as set forth in claim 1 or claim 2, characterized in that said ZMP compensating stage comprises:
   a virtual ZMP target value former for comparing an actual measurement value of ZMP detected by said ZMP sensor with the ZMP target value from said ZMP converter to form a virtual ZMP target value,
   a parameter former for forming a force of inertia control parameter for use in forming the ZMP virtual target value from the ZMP target value to compensate the latter, and a stabilizing filter for compensating the ZMP target value on the basis of the force of inertia control parameter from said parameter former.

4. A biped walking mobile system as set forth in claim 3, characterized in that said ZMP virtual target value former is adapted to judge if the formed ZMP virtual target value lies within a compensatable limit.

5. A biped walking mobile system as set forth in claim 4, characterized in that if the formed ZMP virtual target value is found to exceed the compensatable limit, said ZMP virtual target value former is adapted to repeat forming a ZMP virtual target value.

6. A biped walking mobile system as set forth in claim 1, characterized in that said ZMP compensating stage compensates the ZMP target value without changing target paths of movement of the leg and foot portions.

7. A walk controller for a biped walking mobile apparatus which includes: a main body having in its lower part a pair of leg portions attached thereto so as to be each pivotally movable biaxially, each of the leg portions having a knee portion in its midway and a foot portion at its lower end, the foot portions being attached to its corresponding leg portion so as to be pivotally movable biaxially,
   drive means associated with said leg, knee and foot portions for pivotally moving them, respectively, and
   a gait former responsive to a demand for motion for forming gait data including data for a target angular path, data for a targeted angular velocity and data for a targeted angular acceleration, whereby said walk controller controls respective driving actions of said drive means on the basis of said gait data, said walk controller having a ZMP compensator and being characterized in that said ZMP compensator includes:
   a ZMP sensor for detecting ZMP for each of said foot portions,
   a ZMP converter for computing a ZMP target value on the basis of said gait data from said gait former, and
   a ZMP compensating stage for comparing an actual measurement value of ZMP detected by said ZMP sensor with the ZMP target value from said ZMP converter to modify the targeted angular velocity and acceleration in the gait data from said gait former and thereby to compensate or correct said ZMP target value wherein said ZMP stands for Zero Moment Point.

8. A walk controller for a biped walking mobile apparatus, as set forth in claim 7, characterized in that said ZMP compensating stage comprises:
   a virtual ZMP target value former for comparing the actual measurement value of ZMP detected by said ZMP sensor with the ZMP target value from said ZMP converter to form a virtual ZMP target value,
   a parameter former for forming a force of inertia control parameter for use in for forming the ZMP virtual target value from the ZMP target value to compensate the latter, and
   a stabilizing filter for compensating the ZMP target value on the basis of the force of inertia control parameter from said parameter former.

9. A walk controller for a biped walking mobile apparatus, as set forth in claim 8, characterized in that said ZMP virtual target value former is adapted to judge if the formed ZMP virtual target value lies within a compensatable limit.

10. A walk controller for a biped walking mobile apparatus, as set forth in claim 9, characterized in that if the formed ZMP virtual target value is found to exceed the compensatable limit, said ZMP virtual target value former is adapted to repeat forming a ZMP virtual target value.

11. A walk controller for a biped walking mobile apparatus, as set forth in claim 7, characterized in that said ZMP compensating stage compensates the ZMP target value without changing target paths of movement of the leg and foot portions.

12. A walk control method for a biped walking mobile apparatus which includes: a main body having in its lower part a pair of leg portions attached thereto so as to be each pivotally movable biaxially, each of the leg portions having a knee portion in its midway and a foot portion at its lower end, the foot portions being attached to its corresponding leg portion so as to be pivotally movable biaxially, drive means associated with said leg, knee and foot portions for pivotally moving them, respectively, and a gait former responsive to a demand for motion for forming gait data including data for a target angular path, data for a targeted angular velocity and data for a targeted angular acceleration, the method controlling respective driving actions of said drive means on the basis of said gait data, the method being characterized in that the it in performing a ZMP compensation comprises:

the first step of detecting ZMP for each of said foot portions by a ZMP detecting sensor;

the second step of computing a ZMP target value at a ZMP converter on the basis of said gait data from said gait former; and the third step of comparing a ZMP actual measurement value detected by said ZMP detecting sensor with the ZMP target value and modifying the target angular velocity and angular acceleration in the gait data from said gait former, thereby compensating said ZMP target value wherein said ZMP stands for Zero Moment Point.

13. A walk control method for a biped walking mobile apparatus as set forth in claim 12, characterized in that the third step includes the sub-steps of: comparing the ZMP actual measurement value detected by said ZMP sensor with the ZMP target value from said ZMP converter to form a ZMP virtual target value, forming a force of inertia control parameter for use in forming the ZMP virtual target value from said ZMP target to compensate the latter, and compensating the ZMP target value at a stabilizing filter on the basis of said force of inertia control parameter.

14. A walk control method for a biped walking mobile apparatus as set forth in claim 13, characterized in that the step of forming the ZMP virtual target value includes judging if the formed virtual target value lies within a compensatable limit.

15. A walk control method for a biped walking mobile apparatus as set forth in claim 14, characterized in that the step of forming the ZMP virtual target value includes repeating forming a ZMP virtual target value if the formed ZMP virtual target value is found to exceed said compensatable limit.

* * * * *